United States Patent [19]

Yoshimatsu

[11] Patent Number: 5,106,943

[45] Date of Patent: Apr. 21, 1992

[54] RESIN COMPOSITIONS, SHAPED ARTICLES, AND METHODS FOR MANUFACTURE

[75] Inventor: Shinichi Yoshimatsu, Osaka, Japan

[73] Assignee: Takeda Chemical Industries, Ltd., Osaka, Japan

[21] Appl. No.: 587,783

[22] Filed: Sep. 26, 1990

[30] Foreign Application Priority Data

Oct. 4, 1989 [JP] Japan ................................. 1-259763

[51] Int. Cl.⁵ .............................................. C08G 18/80
[52] U.S. Cl. ........................................ 528/45; 528/68; 528/73
[58] Field of Search ............................. 528/45, 68, 73

[56] References Cited

U.S. PATENT DOCUMENTS 3,494,888  2/1970  McElroy ................................ 260/47

FOREIGN PATENT DOCUMENTS 0368031  5/1990  European Pat. Off. .
61-31420  2/1986  Japan .
64-1715  1/1989  Japan .

*Primary Examiner*—Maurice J. Welsh
*Attorney, Agent, or Firm*—Wenderoth, Lind & Ponack

[57] ABSTRACT

The resin composition of this invention comprises an isocyanurate ring-containing polyisocyanate such as trimeric hexamethylene-1,6-diisocyanate, an epoxy compound such as bisphenol A epoxy resin, and an aromatic polyamine such as 3,3'-dichloro-4,4'-diaminodiphenylmethane. This resin composition is particularly suitable for the manufacture of shaped articles to be used in high temperature environments.

20 Claims, No Drawings

RESIN COMPOSITIONS, SHAPED ARTICLES, AND METHODS FOR MANUFACTURE

FIELD OF THE INVENTION

The present invention relates to resin compositions suitable for the manufacture of shaped articles to be used in high temperature applications, shaped articles manufactured therefrom, and methods for manufacturing such shaped articles.

BACKGROUND OF THE INVENTION

The hitherto-known moldable resin compositions having high strength and high elastic modulus include such resin-compositions as each comprises a polyol (e.g. a polyether polyol or a polyester polyol), an aromatic polyisocyanate (e.g. tolylene diisocyanate) and an aromatic polyamine (e.g. 3,3'-dichloro-4,4'-diaminodiphenylmethane), and such resin compositions as each comprises an NCO-terminated prepolymer derived from a polyol and an aromatic polyisocyanate, and an aromatic polyamine.

However, a shaped article obtainable by casting such a known resin composition into a casting mold and causing it to cure in situ is not satisfactory in mechanical properties such as hardness, strength and elastic modulus, and, moreover, is liable to vary its mechanical properties depending on temperature. Particularly at high temperatures exceeding about 80° C., the characteristics of such shaped articles are considerably sacrificed. Therefore, these conventional resin compositions can hardly be employed for the manufacture of products required to be stable at high temperature. Furthermore, these resin systems are characterized by high reaction rates of components so that, on admixture of the components, the composition tends to undergo a sharp increase in viscosity or show a sudden evolution of intense heat. Therefore, these compositions are not only poor in storage stability and moldability but tend to cause troubles such as non-uniformity of products and cracking due to thermal shrinkage.

As a resin composition claimed to resolve the above-mentioned problems, Japanese Patent laid open No. 31420/1986 proposes a resin composition comprising an NCO-terminated urethane prepolymer derived from a polyol, an isocyanurate ring-containing polyisocyanate and a non-aromatic diisocyanate, and an aromatic polyamine. Japanese Patent laid open No. 1715/1989 also discloses a resin composition comprising an aromatic polyamine and an isocyanurate ring-containing aliphatic polyisocyanate.

The shaped articles obtainable from these resin compositions are somewhat superior to the earlier compositions in strength and modulus at high temperature but are not as satisfactory as desired in some or other quality parameters, namely hardness, strength, elastic modulus and elongation, as well as in toughness. Moreover, the temperature dependency of shaped articles are still large so that they suffer considerable losses in mechanical properties such as hardness, strength, elastic modulus and so on at high temperatures over 80° C., particularly over 100° C. The adhesiveness to certain adherends such as metal or plastic parts is not as high as desired, either. Therefore, in applications involving high temperatures where pressure hysteresis is inevitable, the durability of shaped articles is sacrificed to considerably limit their utility range.

SUMMARY OF THE INVENTION

It is an object of the present invention to provide a resin composition with improved hardness, strength, modulus, elongation and toughness.

It is another object of the invention to provide a resin composition useful for the manufacture of shaped articles with a minimum of temperature dependency and high hardness.

It is still another object of the invention to provide a resin composition insuring improved adhesion to various adherends.

It is still another object of the invention to provide a resin composition having improved storage stability.

It is a further object of the invention to provide a shaped article having the above-mentioned desirable characteristics and capable of exhibiting such characteristics and high durability even in high-temperature environments.

It is a still further object of the invention to provide a method of manufacturing shaped articles having said desirable characteristics, free of cracks and other defects and uniform in quality without compromise of workability.

The inventor of the present invention found, as a result of his intensive research, that when a mixture of an isocyanurate ring-containing polyisocyanate and an epoxy compound is cured with an aromatic polyamine, there is obtained a cured resin having high hardness, high strength, high modulus and high toughness, with the temperature at which physical properties inclusive of strength begin to deteriorate having been shifted remarkably toward the higher end of the temperature scale, the temperature dependency of such physical characteristics decreased and the adhesion to various adherends such as metal and other plastic parts improved. These findings led to accomplishment of the present invention.

The present invention, thus, provides a resin composition comprising an isocyanurate ring-containing polyisocyanate, an epoxy compound and an aromatic polyamine.

The present invention further provides a shaped article manufactured by curing of said resin composition.

The invention further provides a method of manufacturing a shaped article which comprises curing a mixture of an isocyanurate ring-containing-polyisocyanate, an epoxy compound and an aromatic polyamine.

DETAILED DESCRIPTION OF THE INVENTION

The resin composition of the present invention contains an isocyanurate ring-containing polyisocyanate, that is to say an organic polyisocyanate trimer.

The organic polyisocyanate as used herein includes, for example, aromatic polyisocyanates such as p-phenylene diisocyanate, 2,4-tolylene diisocyanate, 2,6-tolylene diisocyanate, diphenylmethane-4,4'-diisocyanate, 3,3'-dimethyldiphenylmethane-4,4'-diisocyanate, triphenylmethane triisocyanate, 1,5-naphthalene diisocyanate, etc.; aliphatic polyisocyanates such as hexamethylene-1,6-diisocyanate, 1,3,6-hexamethylene triisocyanate, 2,2,4-trimethylhexamethylene-1,4-diisocyanate, lysine diisocyanate, etc.; alicyclic polyisocyanates such as isophorone diisocyanate, cyclohexane-1,4-diisocyanate, cyclohexane-1,6-diisocyanate, hydrogenated xylylene diisocyanate, hydrogenated diphenylmethane diisocyanate etc.; and araliphatic polyisocyanates such as xylylene diisocyanate, tetramethylxylylene diisocyanate and so on. Such isocyanurate ring-containing polyisocyanates can be used independently or in combination. Furthermore, such isocyanurate ring-containing polyisocyanates may be blocked isocyanates wherein the isocyanato groups have been blocked with various blocking agents such as phenols, alcohols, lactams or oximes.

Among trimers of such organic polyisocyanates, the trimers of aliphatic polyisocyanates such as, trimeric hexamethylene-1,6-diisocyanate which is liquid, are particularly preferred from the standpoint of workability. An isocyanate mixture comprising trimeric hexamethylene-1,6-diisocyanate as a dominant constituent and one or more other polyisocyanate trimers, such as trimeric isophorone diisocyanate, as a minor constituent is also useful.

Such an organic polyisocyanate trimer can be prepared by permitting a known trimerization catalyst to act upon an organic polyisocyanate to give a cyclic trimer.

The trimerization catalyst that can be employed for this purpose includes, for example, metal salts of carboxylic acids, such as potassium acetate, potassium propionate, sodium benzoate, sodium oleate, potassium oleate, potassium linolenate, potassium naphthenate, lead naphthenate, lead caprylate, etc.; trialkylphosphines such as triethylphosphine, tributylphosphine, etc.; organic bases and salts thereof such as 2,4,6-tris(-dialkylaminomethyl)phenol, N,N',N''-tris(alkylaminoalkyl)hexahydro-sym-triazine, etc.; tertiary amines and salts thereof such as triethylamine, tripropylamine, tributylamine, N-methylmorpholine, N,N'-diethylpiperazine, etc.; Friedel-Crafts catalysts such as $AlCl_2$, $FeCl_3$, $BF_3$, $ZnCl_2$, etc.; alkali metal oxides such as potassium oxide, sodium oxide, etc.; and alcoholates such as sodium methoxide, potassium ethoxide and so on.

The epoxy compound may be any of aliphatic, alicyclic and aromatic compounds containing at least one epoxy group per molecule. Examples of such epoxy compound are glycidyl ether, glycidyl ester and glycidylamine type epoxy compounds which are obtainable by reacting epichlorohydrin with active hydrogen compounds, for example compounds containing any of hydroxy, carboxy, amino and the like groups; and epoxy compounds wherein the double bond has been oxidized with an appropriate oxidizing agent such as peracetic acid.

Among said glycidyl ether epoxy compounds are butyl glycidyl ether, allyl glycidyl ether, phenyl glycidyl ether, polyoxyalkylene glycol diglycidyl ethers such as ethylene glycol diglycidyl ether, diethylene glycol diglycidyl ether, propylene glycol diglycidyl ether, dipropylene glycol diglycidyl ether etc., tetrakis(glycidyloxyphenyl)ethane, bisphenol A epoxy resin, bisphenol F epoxy resin, bisphenol AD epoxy resin, bisphenol S epoxy resin, phenol novolac epoxy resin, cresol novolac epoxy resin, hydrogenated bisphenol A epoxy resin, glycidyl ethers of bromine-containing compounds such as tetrabromobisphenol A, heterocycle-containing epoxy compounds such as triglycidyl isocyanurate etc., hydantoin epoxy compounds such as diglycidylhydantoin etc., spiro ring-containing epoxy resin and so on.

Among said glycidyl ester epoxy compounds are diglycidyl phthalate, diglycidyl tetrahydrophthalate, diglycidyl hexahydrophthalate, dimer acid glycidyl ester and so on.

Among said glycidylamine epoxy compounds are diglycidylaniline, diglycidyltoluidine, 2,4,6-tribromodiglycidylaniline, triglycidyl-p-aminophenol, tetraglycidyldiaminodiphenylmethane, tetraglycidyl-m-xylylenediamine and so on.

Among said epoxy compounds oxidized with an oxidizing agent such as peracetic acid are alicyclic epoxy compounds obtainable by oxidizing the double bond of the cyclohexene ring, and alicyclic diepoxy acetal, alicyclic diepoxy adipate and so on.

These epoxy compounds can be used independently or in combination.

By selecting an appropriate compound from among the above-mentioned epoxy compounds, the mechanical characteristics and compatible temperature range of the shaped article can be controlled as desired. For the purpose of enhancing the heat resistance, hardness, strength, etc. and yet diminishing the temperature dependency of shaped articles, it is advantageous to employ, among said various epoxy compounds, glycidyl ether-type, glycidyl ester-type or glycidylamine-type epoxy compounds and, particularly, aromatic epoxy compounds. Furthermore, among such aromatic epoxy compounds, monofunctional epoxy compounds, such as phenyl glycidyl ether, and the compounds of the following general formula (I) are particularly useful.

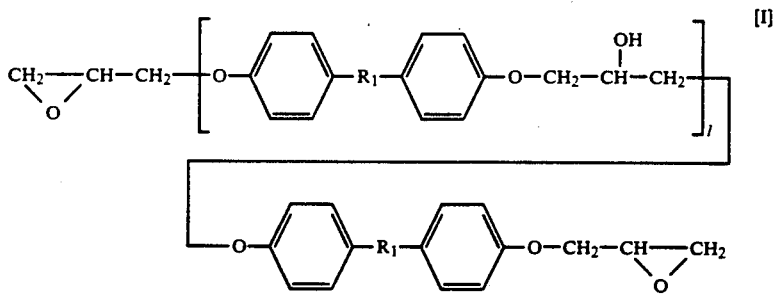

wherein $R_1$ is methylene, methylmethylene, dimethylmethylene or sulfonyl group and l is a whole number of 0 to 15.

Among epoxy compounds of the above general formula [I], bisphenol A epoxy resin and bisphenol F epoxy resin are preferred. Particularly preferred is bisphenol A epoxy resin.

In this connection, a mixture of a hydroxy-free epoxy compound, particularly an epoxy compound of general formula [I] wherein l=0, and said isocyanurate ring-containing polyisocyanate is particularly desirable in that it is especially low in the rate of viscosity buildup and offers excellent storage stability and molding workability.

A preferred species of the epoxy compound is the epoxy compound of general formula [I] wherein $R_1$ is dimethylmethylene and $l=0$.

The ratio of such epoxy compound to said isocyanurate ring-containing polyisocyanate can be selected from a broad range within which the characteristics of shaped articles are not adversely affected. Generally, however, the above ratio is not less than 5 percent by weight and preferably 5 to 80 percent by weight.

The aromatic polyamine acts as a curing agent for both the isocyanurate ring-containing polyisocyanate and the epoxy compound. The kind of aromatic polyamine is not critical unless it adversely affects the characteristics of shaped articles. As the aromatic polyamine, polyamines of the following general formula [II] or [III], as well as other monocyclic aromatic polyamines, can be employed.

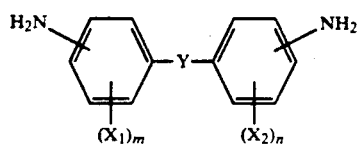

[II]

wherein Y is a methylene group, $-S(CH_2)pS-$ (p represents a whole number of 0 to 4), $-COO-A-OOC-$ (A represents an alkylene group of 2 to 6 carbon atoms), or a sulfonyl group; $X_1$ and $X_2$ are the same or different and each is a halogen atom or an alkyl group of 1 to 4 carbon atoms; m and n each is a whole number of 0 to 4.

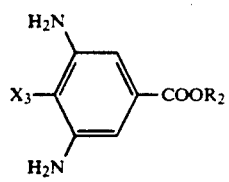

[III]

wherein $R_2$ is a $C_{1-20}$ alkyl group, an aryl group, an aralkyl group or a cycloalkyl group; $X_3$ is a halogen atom or an alkoxy group.

In the aromatic polyamine of general formula [II], the $C_{2-6}$ alkylene group represented by A may be methylene, ethylene, propylene, tetramethylene, 1,3-butylene, pentamethylene, hexamethylene or the like. The $C_{1-4}$ alkyl group represented by $X_1$ and $X_2$ may for example be metyl, ethyl, propyl, isopropyl, butyl or isobutyl.

In the aromatic polyamine of general formula [II] and of general formula [III], the halogen atom represented by $X_1$, $X_2$ and $X_3$ includes fluorine, chlorine, bromine and iodine.

Referring, further, to the aromatic polyamine of general formula [III], the $C_{1-20}$ alkyl group represented by $R_2$ includes, in addition to the $C_{1-4}$ alkyl groups mentioned above, heptyl, hexyl, pentyl, octyl, dodecyl and so on. The aryl group includes phenyl, naphthyl, etc., and the aralkyl group includes benzyl, phenethyl, etc., and the cycloalkyl group includes cyclohexyl and so on. The alkoxy group $X_3$ includes, for example, methoxy, ethoxy, propoxy, isopropoxy, butoxy, isobutoxy and tert-butoxy.

Preferred species of the aromatic polyamine of general formula [II] wherein Y is a methylene group are diaminodiphenylmethane-type aromatic diamines such as 4,4'-diaminodiphenylmethane, 3,3'-dichloro-4,4'-diaminodiphenylmethane, 3,3',5,5'-tetrachloro-4,4'-diaminodiphenylmethane, 2,3-dichloro-4,4'-diaminodiphenylmethane, 2,2'-dimethyl-4,4'-diaminodiphenylmethane, 2,2'-diethyl-4,4'-diaminodiphenylmethane, 3,3'-diethyl-4,4'-diaminodiphenylmethane, 2,2',3,3'-tetrachloro-4,4'-diaminodiphenylmethane, 3,3',5,5'-tetramethyl-4,4'-di-aminodiphenylmethane, 3,3',5,5'-tetraethyl-4,4'-diaminodiphenylmethane and so on.

Preferred species of the compound of general formula [II] wherein Y is a group represented by the formula $-S(CH_2)pS-$ are 1,2-bis(2-aminophenylthio)ethane, 1,2-bis(4-aminophenylthio)ethane, 1,2-bis(3-chloro-4-aminophenylthio)ethane, 1,2-bis[3-ethyl-4-aminophenylthio)ethane and so on.

Preferred species of the compound of general formula [II] wherein Y is a group of the formula $-COO-A-OOC-$ are 1,3-bis(4-aminobenzoyloxy)propane, 1,3-bis(3-chloro-4-aminobenzoyloxy)propane and so on.

Preferred species of the compound of general formula [II] wherein Y is a sulfonyl group are 4,4'-diaminodiphenylsulfone, 3,3'-dimethyl-4,4'-diaminodiphenyl-sulfone, 3,3'-diethyl-4,4'-diaminodiphenylsulfone and so on.

Among preferred compounds of general formula [III] are methyl 3,5-diamino-4-chlorobenzoate, ethyl 3,5-diamino-4-chlorobenzoate, n-propyl 3,5-diamino-4-chlorobenzoate, isobutyl 3,5-diamino-4-chlorobenzoate, isobutyl 3,5-diamino-4-ethoxybenzoate and so on.

Among said other monocyclic aromatic polyamines are 2,4-diaminotoluene, 2,6-diaminotoluene, 3,5-diethyl-2,4-diaminotoluene, 3,5-diethyl-2,6-diaminotoluene, 3,5-dithiomethy1,2,4-diaminotoluene, 3,5-dithiomethyl-2,6-diaminotoluene, m-phenylenediamine, p-phenylenediamine, m-xylylenediamine, p-xylylenediamine, tetrachlorop-xylylenediamine and so on.

These aromatic polyamines can be used independently or in combination.

Suitable species of said aromatic polyamine can be selected according to the intended use for the resin composition, the required workability and so on. For the manufacture of an industrial roll, for instance, an aromatic polyamine having a melting point of not higher than 130° C. is preferred. The particularly preferred aromatic polyamine is 3,3'-dichloro-4,4'-diaminodiphenylmethane phenylmethane or 3,3',5,5'-tetrachloro-4,4'-diaminodiphenylmethane. The industrial roll includes a variety of rolls such as steelmaking rolls, printing rolls, and callender or press rolls used for surface finishing or glazing in paper mills, textile mills and magnetic tape factories which produce tapes for use as magnetic recording media.

The proportion of the aromatic polyamine may vary within a broad range wherein the desired characteristics of shaped articles are not adversely affected. Generally speaking, the proportion of the aromatic polyamine should be such that the mol ratio of isocyanato and epoxy groups to amino groups is in the range of 0.5 to 2.0, preferably in the range of 0.80 to 1.20, and more preferably in the range of 0.95 to 1.05.

The resin composition of the present invention may contain a curing catalyst in addition to the above-mentioned essential components. As the curing catalyst, various compounds which are commonly used in the reaction of an isocyanate compound with an amine compound or in the reaction of an epoxy compound with an amine compound can be employed. Thus, such curing catalyst includes, for example, organometal salts such as dibutyltin dilaurate, stannous octoate, etc.; quaternary ammonium salts such as triethylbenzylammonium chloride, tetramethylammonium chloride, etc.; tertiary amines such as triethylamine, tributylamine, benzyldimethylamine, N-ethylmorpholine, tris(dimethylaminomethyl)phenol, 2-methylimidazole, 2-methyl-4-ethylimidazole, etc.; metal halides such as $AlCl_2$, $FeCl_3$, $BF_3$, $ZnCl_2$, etc.; and organic acids such as adipic acid, salicylic acid, benzoic acid and so on. These curing catalysts can be used independently or in combination.

The proportion of the curing catalyst is generally not more than 5 percent by weight and preferably about 0.01 to 1 percent by weight.

If necessary, the resin-composition of the invention may further contain various additives such as the antioxidant, ultraviolet absorber, discoloration inhibitor, hydrolysis inhibitor, antifungal agent, flame retardant, extender, filler, colorant and so on. Furthermore, depending on the intended use, the resin composition of the present invention may contain an organic solvent.

Being obtainable by curing the above-described resin composition, the shaped article of the invention has the following characteristics.

(1) High hardness, high strength, high modulus of elasticity, high elongation and high toughness.

(2) High adhesion to various adherends (3) High heat resistance and low temperature dependency (4) High toughness because of improved resistance to pressure histeresis at high temperature.

The shaped article of the present invention can be manufactured according to a conventional method for molding a polyurethane resin, i.e., by casting a molten mixture of an isocyanurate ring-containing polyisocyanate, an epoxy compound and an aromatic polyamine into a casting mold, causing it cure in situ and releasing the cured resin product from said mold.

While the shaped article of the invention may also be manufactured by concurrent blending of the isocyanurate ring-containing polyisocyanate, epoxy compound and aromatic polyamined it is preferable to first admix the isocyanurate ring-containing polyisocyanate with the epoxy compound and, then, add the aromatic polyamine. To be specific, the preferred manufacturing process comprises the steps of heating the isocyanurate ring-containing polyisocyanate and epoxy compound to prepare a molten mixture, melting and adding the aromatic polyamine to said molten mixture with stirring, if necessary followed by degassing the resulting composition under reduced pressure, casting the composition in a casting mold to allow it to cure under heating, and releasing the cured resin product from the mold.

In the preparation of the polyisocyanate-epoxy compound mixture and addition of the aromatic polyamine, the proper melting temperatures can be selected with reference to the melting and softening points of the respective components. By way of illustration, the melting temperature may be about 30° to 110° C. and preferably about 40° to 80° C. for the isocyanurate ring-containing polyisocyanate and epoxy compound and about 110° to 130° C. for the aromatic polyamine.

When choice is made of the process wherein the aromatic polyamine, which functions as a curing agent for both the isocyanurate ring-containing polyisocyanate and the epoxy compound, is added after mix-melting of the latter two components, the whole procedure can be conveniently carried out with good workability because a mixture of the isocyanurate ring-containing polyisocyanate and epoxy compound is comparatively stable so that a shaped article of uniform quality can be obtained. In connection with the above comparatively stable polyisocyanate-epoxy compound mixture, the epoxy compound is preferably a compound not containing an active hydrogen atom and more desirably an epoxy compound of general formula [I] wherein $l = 0$. The use of this epoxy compound yields a mixture with particularly improved storage stability.

The curing catalyst and other additives mentioned hereinbefore can be added at any desired stage preceding the molding stage, for example in the course of preparation of said molten mixture or in the step of adding the aromatic polyamine.

In the molding stage, the casting mold is preferably preheated, for example at about 100° to 140° C., in order that the uniformity of the product may be further improved. The curing reaction of the resin composition can be conducted at a temperature of, for example, about 100° to 140° C. The cured resin product can generally be released from the mold after about one hour. Thereafter, the product may be allowed to post-cure at the same temperature for 4 to 16 hours and, if necessary, to age at room temperature for 3 to 7 days.

The resin composition of the present invention can be used as a molding material for a variety of products required to be stable and exhibit excellent characteristics at high temperatures, such as a molding material for said industrial rolls or a matrix resin for the manufacture of fiber-reinforced composite materials, for instance.

The following examples and comparative examples are intended to illustrate the present invention in further detail and should by no means be construed as defining the metes and bounds of the invention.

EXAMPLE 1

A four-necked flask fitted with a stirring rod and thermometer was charged with 20 parts by weight of bisphenol A epoxy resin (the compound of general formula [I] wherein $l=0$; trade name YD-8125, manufactured by Tohto Kasei K.K.) and the charge was heated at 60° to 80° C. with stirring in a nitrogen gas stream. Then, 80 parts by weight of trimeric hexamethylene-1,6-diisocyanate (a cyclic trimer manufactured by Takeda Chemical Industries, Ltd., trade name Takenate D-170N; NCO content 21 wt.%) was added and the mixture amounting to 100 parts by weight was heated at 40° C. To this mixture was added 61 parts by weight of 3,3'-dichloro-4,4'-diaminodiphenylmethane previously melted by heating at 120° C., followed by stirring to prepare a resin composition. This composition was degassed under a vacuum of 10 to 20 mmHg and cast into a casting mold preheated at 110° C. The resin composition was allowed to cure in the mold at the same temperature for about 1 hour, after which the product was released and post-cured at the same temperature for 16 hours. The procedure gave a cured resin sheet. The mol ratio of isocyanato and epoxy groups to amino groups was 1.0.

EXAMPLE 2

A flask similar to the one used in Example 1 was charged with 10 parts by weight of phenyl glycidyl ether (Nagase Chemicals, LTD., trade name DENACOL EX-141) and heated at 60° to 80° C. with stirring. Then, 90 parts by weight of the same cyclic trimer of hexamethylene-1,6-diisocyanate as used in Example 1 was added. The mixture amounting to 100 parts by weight was heated at 40° C. and mixed with 64 parts by weight of 3,3'-dichloro-4,4'-diaminodiphenylmethane melted at 120°. The resulting resin composition was casted and cured in the same manner as Example 1 to give a cured resin sheet.

The mechanical properties of the cured resin sheets obtained in Examples 1 to 4 and Comparative Examples 1 and 2, respectively, are shown in Table 1. The strength at break of the sheet was measured in accordance with JIS K7113 and the Shore hardness was measured in accordance with ASTM D1706.

TABLE 1

|  |  | Example 1 | Example 2 | Example 3 | Example 4 | Comparative Example 1 | Comparative Example 2 |
|---|---|---|---|---|---|---|---|
| Strength at break (kg/cm$^2$) |  | 1000 | 1000 | 1200 | 900 | 800 | 810 |
| Elongation at break (%) |  | 20 | 25 | 15 | 20 | 10 | 90 |
| Hardness at 25° C. |  | 85 | 85 | 87 | 85 | 85 | 78 |
| Loss of | 80° C. | 0 | 0 | 0 | 1 | 1 | 6 |
| hardness on heating | 110° C. | 2 | 3 | 1 | 3 | 4 | 13 |

EXAMPLE 3

A cured sheet was produced in the same manner as Example 1 except that 72 parts by weight of trimeric hexamethylene-1,6-diisocyanate and 8 parts by weight of trimeric isophorone diisocyanate-monomeric isophorone diisocyanate mixture (NCO concentration 28 wt. %) were used in lieu of 80 parts by weight of trimeric hexamethylene-1,6-diisocyanate, and that the level of addition of 3,3'-dichloro-4,4'-diaminodiphenylmethane was adjusted to 63 parts by weight.

EXAMPLE 4

A cured sheet was produced in the same manner as Example 1 except that 77 parts by weight of 3,3',5,5'-tetrachloro-4,4'-diaminodiphenylmethane was used in lieu of 3,3'-dichloro-4,4'-diaminodiphenylmethane.

Comparative Example 1

The same trimeric hexamethylene-1,6-diisocyanate as used in Example 1 (100 parts by weight) was preheated at 40° C. and 66 parts by weight of 3,3'-dichloro4,4'-diaminodiphenylmethane, previously melted at 110° to 120° C., was added with stirring to prepare a resin composition. This composition was degassed under 10 to 20 mmHg and cast into a mold preheated at 110° C. and allowed to cure in the same manner as in Example 1 to give a cured resin sheet.

Comparative Example 2

A four-necked flask fitted with a stirring rod and thermometer was charged with 100 parts by weight of polytetramethylene ether glycol (number average molecular weight 700) and after dehydration under a reduced pressure of 3 to 5 mmHg at 110° C., 10.6 parts by weight of trimeric isophorone diisocyanate (NCO content 18.9 wt. %) was added. The mixture was reacted in a nitrogen stream at 100° C. for 6 hours. Then, 60.3 parts by weight of cyclohexane-1,4-diisocyanate was added and the mixture was further reacted at 100° C. for 5 hours to give an NCO-terminated prepolymer (NCO content 11.9 wt. %).

The prepolymer (100 parts by weight) was heated at 90° C. and 34.4 parts by weight of 3,3'-dichloro-4,4'-diaminodiphenylmethane, previously melted by heating at 110° C. to120° C., and 0.05 parts by weight of adipic acid were added with stirring to give a resin composition. This resin composition was degassed in a vacuum of 10 to 20 mmHg and cast and caused to cure in the same manner as in Example 1 to give a cured resin sheet.

It is apparent from Table 1 that compared with the cured resin sheets of Comparative Example 1 and Comparative Example 2, the cured resin sheets of Examples 1 to 4 were higher in strength, elongation, toughness and hardness and were less temperature-dependent.

The storage stability of the polyisocyanate-epoxy resin mixture contained in the resin composition of Example 1 was tested in the following manner. Thus, the above mixture was placed in a vessel filled with nitrogen gas and stored in a drying chamber maintained at a predetermined temperature. Then, the time courses of changes in isocyanate (NCO) content and viscosity were followed in accordance with JIS K7301 to evaluate the storage stability. The storage temperatures were 25° C. and 60° C.

The results are presented in Table 2.

Table 2

|  | Storage temperature | Time (in days) | | | | |
|---|---|---|---|---|---|---|
|  |  | 0 | 1 | 2 | 3 | 7 |
| NCO content (%) | 25° C. | 16.6 | 16.6 | 16.6 | 16.6 | 16.6 |
|  | 60° C. | 16.6 | 16.6 | 16.6 | 16.6 | 16.5 |
| Viscosity (cps, 25° C.) | 25° C. | 2000 | 2000 | 2000 | 2000 | 2000 |
|  | 60° C. | 2000 | 2000 | 2000 | 2000 | 2100 |

It is apparent from Table 2 that the mixture of Example 1 is highly stable with a minimum of decrease in NCO content and a minimum of viscosity buildup even when stored at high temperature.

What is claimed is:

1. A resin composition comprising a trimer of an organic polyisocyanate having two or three isocyanato groups which are optionally blocked, an epoxy compound and an aromatic polyamine.

2. The resin composition of claim 1, wherein said trimer is an aromatic, aliphatic, alicyclic or araliphatic polyisocyanate trimer.

3. The resin composition of claim 1, wherein said trimer is an aliphatic polyisocyanate trimer.

4. The resin composition of claim 1, wherein said trimer is a mixed polyisocyanate comprising trimeric hexamethylene-1,6-diisocyanate as a major constituent and one or more other organic polyisocyanate trimers as a minor constituent.

5. The resin composition of claim 1, wherein said trimer is trimeric hexamethylene-1,6-diisocyanate.

6. The resin composition of claim 1, wherein said epoxy compound is an aliphatic, alicyclic or aromatic epoxy compound containing one or more epoxy groups.

7. The resin composition of claim 1, wherein said epoxy compound is an epoxy compound containing no active hydrogen atom.

8. The resin composition of claim 6, wherein said epoxy compound is a glycidyl ether, glycidyl ester or glycidylamine type epoxy compound.

9. The resin composition of claim 6, wherein said epoxy compound is an aromatic epoxy compound.

10. The resin composition of claim 6, wherein said epoxy compound is a compound of the following general formula [I]

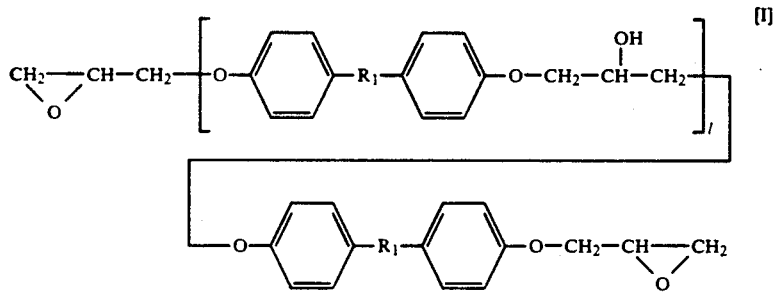

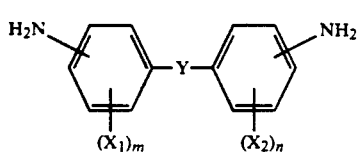

is a methylene group, -S(CH$_2$)pS-(p is a whole number of 0 to 4), -COO-A-OOC- (wherein is an alkylene group of 2 to 6 carbon atoms or a sulfonyl group; X$_1$ and X$_2$ are the same or different and each means a halogen atom or an alkyl group of 1 to 4 carbon atoms; m and n each is a whole number of 0 to 4.

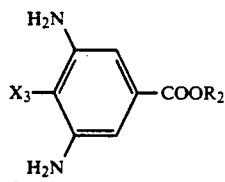

wherein R$_1$ is a methylene group, a methylmethylene group, a dimethylmethylene group or a sulfonyl group; l is a whole number of 0 to 15.

11. The resin composition of claim 10, wherein said epoxy compound is a bisphenol A type epoxy resin or a bisphenol F type epoxy resin.

12. The resin composition of claim 10, wherein said epoxy compound is a compound of general formula [I] wherein l is 0.

13. The resin composition of claim 10, wherein R$_1$ in said epoxy compound of general formula [I] is a dimethylmethylene group.

14. The resin composition of claim 1, wherein said aromatic polyamine is a compound having a melting point not exceeding 130° C.

15. The resin composition of claim 1, wherein said aromatic polyamine is a compound of the following general formula [II] or [III].

wherein R$_2$ is a C$_{1-20}$ alkyl group, an aryl group, an aralkyl group or a cycloalkyl group; X$_3$ is a halogen atom or an alkoxy group.

16. The resin composition of claim 1, wherein said aromatic polyamine is 3,3'-dichloro-4,4'-diaminodiphenylmethane or 3,3',5,5'-tetrachloro-4,4'diaminodiphenylmethane.

17. The resin composition of claim 1, wherein the ratio of said epoxy compound relative to said trimer is 5 to 80 percent by weight.

18. The resin composition of claim 1, wherein the mol ratio of the groups of said isocyanurate trimer and the epoxy groups of said epoxy compound to the amino groups of said aromatic polyamine is in the range of 0.5 to 2.0.

19. The resin composition of claim 1, further comprising not more than 5 percent by weight of a curing catalyst.

20. The resin composition of claim 1, wherein said composition is a matrix resin composition for the production of fiber-reinforced composites.

* * * * *